(12) United States Patent
Guttag et al.

(10) Patent No.: US 6,754,809 B1
(45) Date of Patent: Jun. 22, 2004

(54) DATA PROCESSING APPARATUS WITH INDIRECT REGISTER FILE ACCESS

(75) Inventors: Karl M. Guttag, Dallas, TX (US); David Hoyle, Glendale, AZ (US); Keith Balmer, Bedford (GB)

(73) Assignee: Texas Instruments Incorporated, Dallas, TX (US)

( * ) Notice: Subject to any disclaimer, the term of this patent is extended or adjusted under 35 U.S.C. 154(b) by 687 days.

(21) Appl. No.: 09/713,442

(22) Filed: Nov. 15, 2000

Related U.S. Application Data
(60) Provisional application No. 60/173,921, filed on Dec. 30, 1999.

(51) Int. Cl.[7] ................................................ G06F 9/34
(52) U.S. Cl. .................................................... 712/225
(58) Field of Search ......................................... 712/225

(56) References Cited

U.S. PATENT DOCUMENTS 5,809,327 A * 9/1998 Wollan et al. ............... 712/33
6,178,492 B1 * 1/2001 Matsuo ......................... 712/23
6,588,008 B1 * 7/2003 Heddes et al. ............... 717/149

\* cited by examiner

*Primary Examiner*—Eric Coleman
(74) *Attorney, Agent, or Firm*—Robert D. Marshall, Jr.; W. James Brady, III; Frederick J. Telecky, Jr.

(57) ABSTRACT

A data processing apparatus which uses a register file to provide a faster alternative to indirect memory addressing. A functional unit is connected to a data register file (76) which comprises a plurality of registers, each of which is accessed by a corresponding register number. The functional unit (e.g., A-unit 78) can execute at least one indirect register access instruction that comprises an operand register number field. Instruction decode circuitry, connected to the register file and the functional unit, is responsive to the indirect register access instruction to recall data stored in an operand register (190) specified by the operand register number in the instruction, identify the recalled data as a register access number, and recall operand data from a data register corresponding to the register access number for use as an operand by the functional unit. Indirect register addressing permits the apparatus to more quickly execute table look up intensive algorithms, such as variable length decoding, than an apparatus employing only indirect memory addressing.

30 Claims, 15 Drawing Sheets

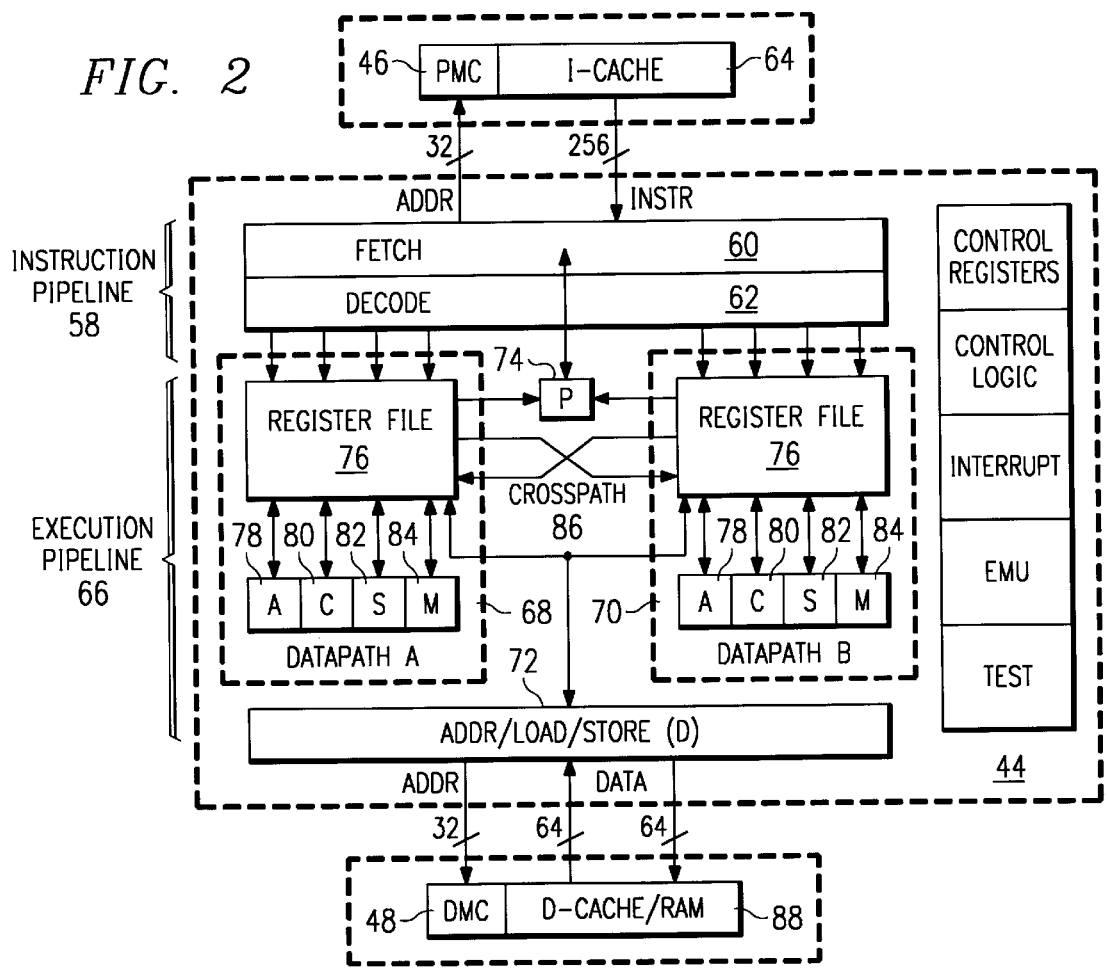

FIG. 2

| UNIT GROUP | OPERATIONS | REGISTER FILE ACCESS | |
|---|---|---|---|
| | | PRIMARY DATAPATH | ALTERNATIVE DATAPATH |
| A | - GENERAL ARITHMETIC<br>- BOOLEAN AND CONTROL REGISTER ACCESS | R/W | R |
| C | - COMPARE, SHIFT, BOOLEAN<br>- ARITHMETIC: ADD, SUB | R/W | R |
| S | - SHIFT, ROTATE, EXTENDED BOOLEAN<br>- ARITHMETIC: ADD, SUB | R/W | R |
| M | - MULTIPLY<br>- ARITHMETIC: ADD, SUB | R/W | R |
| D | - LOAD<br>- STORE<br>- ADDRESS COMPUTATION | W TO BOTH<br>R FROM BOTH<br>R/W BOTH | |
| P | - BRANCH | R FROM BOTH | |

FIG. 3   R=READ, W=WRITE

| STAGE | FUNCTION |
|---|---|
| F0 | SEND PC TO PROGRAM MEMORY CONTROLLER. LDIP ASSIGNED. |
| F1 | CACHE BLOCK SELECT. |
| F2 | ADDRESS PHASE OF INSTRUCTION CACHE ACCESS. |
| F3 | DATA PHASE OF INSTRUCTION CACHE ACCESS. |
| F4 | FETCH PACKET SENT TO DSP. |

*FIG. 5a*

| STAGE | FUNCTION |
|---|---|
| D0 | DETERMINE VALID INSTRUCTIONS IN CURRENT FETCH PACKET. |
| D1 | SORTS INSTRUCTIONS IN EXECUTE PACKET ACCORDING TO DESTINATION UNITS. |
| D2 | INSTRUCTIONS SENT TO DESTINATION UNITS. CROSSPATH REGISTER READS OCCUR. |
| D3 | UNITS DECODE INSTRUCTIONS. REGISTER FILE READ (2ND PHASE). |

*FIG. 5b*

| UNIT | STAGE | FUNCTION |
|---|---|---|
| NON M UNIT | E | EXECUTION OF OPERATION BEGINS AND COMPLETES. FULL RESULT AVAILABLE AT END OF CYCLE. |
| M UNIT | M0 | EXECUTION OF MULTIPLY OPERATION BEGINS. (OR, NON-MULTIPLY OPERATION BEGINS AND COMPLETES.) |
| M UNIT | M1 | MULTIPLY OPERATION CONTINUES. (OR, NON-MULTIPLY RESULT WRITTEN TO REGISTER FILE (PHASE 1).) |
| M UNIT | M2 | MULTIPLY OPERATION COMPLETES. |

*FIG. 5c*

| STAGE | FUNCTION |
|---|---|
| E | ADDRESS GENERATION OCCURS. REGISTER FILE ACCESS FOR READ DATA. |
| L0 | LOAD ADDRESS GENERATED DURING E IS SENT TOWARDS THE DMC. |
| L1 | ADDRESS DECODE, TC ARBITRATION, TAG COMPARES. |
| L2 | ADDRESS DECODE, TC ARBITRATION, TAG COMPARES. |
| L3 | ADDRESS PHASE OF DATA CACHE ACCESS. |
| L4 | DATA PHASE OF DATA CACHE ACCESS. |
| L5 | 64-BIT DATA SENT TO DSP. |

*FIG. 5d*

| STAGE | FUNCTION |
|---|---|
| E | ADDRESS GENERATION OCCURS. REGISTER FILE ACCESS FOR WRITE DATA. |
| S0 | ADDRESS SENT TO DMC. |
| S1 | ADDRESS DECODE IN DMC. WRITE DATA ALIGNMENT. |
| S2 | TAG COMPARE IN DMC. WRITE DATA SENT TO DMC. |
| S3 | ADDRESS PHASE IN DATA CACHE. |
| S4 | DATA PHASE IN DATA CACHE. |

*FIG. 5e*

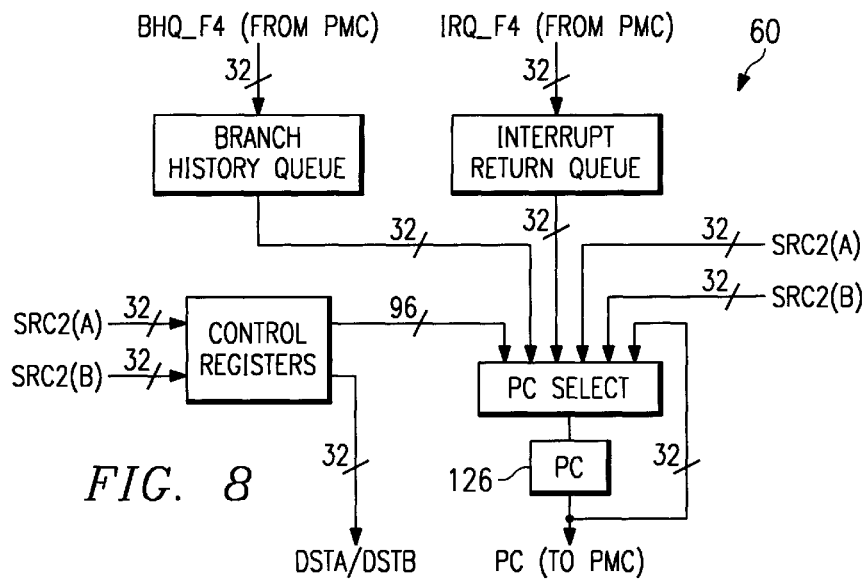

FIG. 8

| || [PREDICATION REG] INSTRUCTION_MNEMONIC .UNIT-DATAPATH-CROSSPATH OP1, OP2, DST |
|---|

WHERE:
    ||                 =TO BE SCHEDULED IN PARALLEL WITH PRECEDING INSTRUCTION(S)
    [PREDICATION REG] =REGISTER CONTAINING PREDICATION VALUE
    .UNIT            =A,C,S,M,D,P UNIT GROUPS
    DATAPATH       =1 FOR DATAPATH A, 2 FOR DATAPATH B
    CROSSPATH      =X IF ONE OPERAND COMES FROM OPPOSITE REGISTER FILE
    OP1, OP2       =SOURCE REGISTERS
    DST              =DESTINATION REGISTER

| UNIT GROUP | ASSEMBLY NOTATIONS | | ASSEMBLY EXAMPLES | WITH CROSSPATH |
|---|---|---|---|---|
| | DATAPATH A | DATAPATH B | | |
| A | .A1 | .A2 | ADD .A1 A1,A2,A3<br>SUB .A2 B1,B2,B3 | ADD .A1X A1,B2,A3<br>SUB .A2X B1,A2,B3 |
| C | .C1 | .C2 | CMPEQ .C1 A1,A2,A3<br>CMPEQ .C2 B1,B2,B3 | CMPEQ .C1X A1,B2,A3<br>CMPEQ .C2X B1,A2,B3 |
| S | .S1 | .S2 | SHL .S1 A1,A2,A3<br>SHL .S2 B1,B2,B3 | SHL .S1X A1,B2,A3<br>SHL .S2X B1,A2,B3 |
| M | .M1 | .M2 | MPY .M1 A1,A2,A3<br>MPY .M2 B1,B2,B3 | MPY .M1X A1,B2,A3<br>MPY .M2X B1,A2,B3 |
| D | .D | | LDB .D *A8,A12<br>STB .D A8,*A12<br>ADDAH .D A8,A2,B1 | n/a |
| P | .P | | B A8 | n/a |

FIG. 15

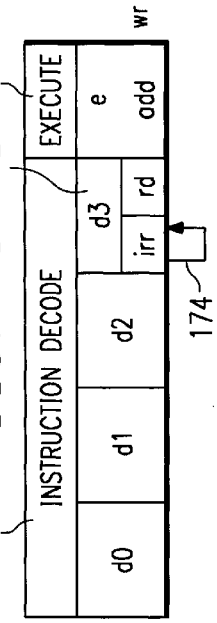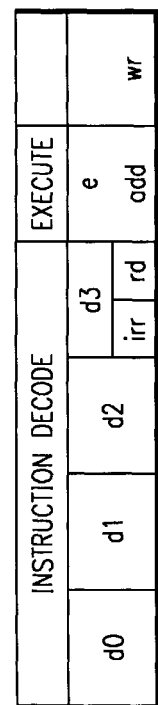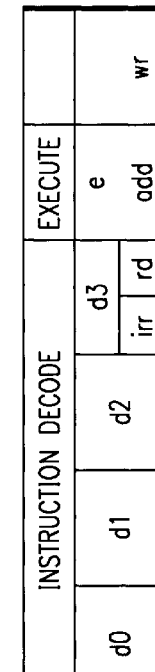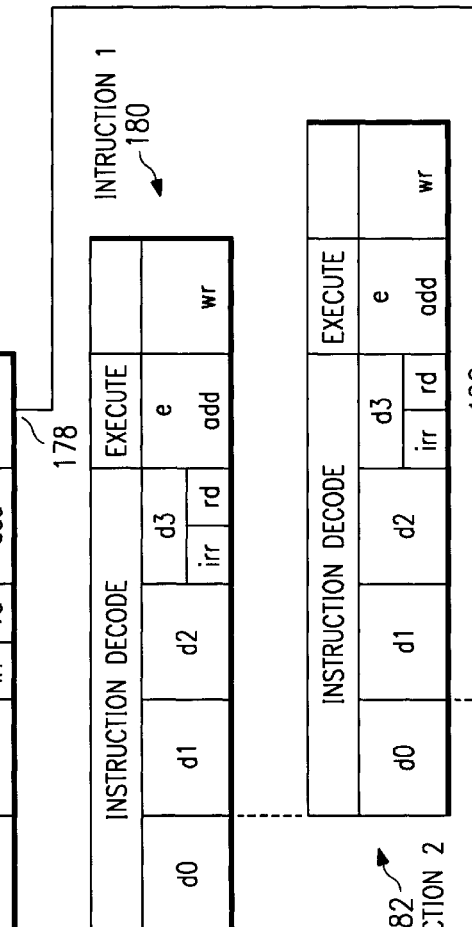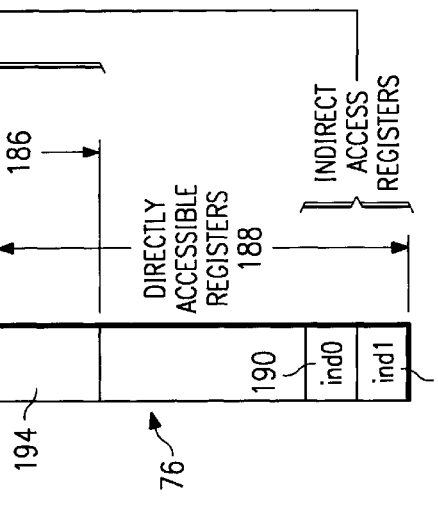

DATA PROCESSING APPARATUS WITH INDIRECT REGISTER FILE ACCESS

This application claims priority under 35 USC §119(e)(1) of Provisional Application No. 60/173,921, filed Dec. 30, 1999.

FIELD OF THE INVENTION

This invention relates to data processing devices, electronic processing and control systems and methods of their manufacture and operation.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. The increasing demands of technology and the marketplace make desirable even further structural and process improvements in processing devices, application systems and methods of operation and manufacture.

SUMMARY OF THE INVENTION

In accordance with a preferred embodiment of the invention, there is disclosed a data processing apparatus which uses a register file to provide a faster alternative to indirect memory addressing. The apparatus comprises a data register file comprising a plurality of registers, each of the plurality of registers accessed by a corresponding register number, at least one functional unit connected to the register file, at least one indirect register access instruction comprising an operand register number field and executable by the functional unit, and instruction decode circuitry connected to the register file and the functional unit. The instruction decode circuitry is responsive to the indirect register access instruction to recall data stored in an operand register specified by the operand register number in the instruction, identify the recalled data as a register access number, and recall operand data from a data register corresponding to the register access number for use as an operand by the functional unit. In further embodiments, only a limited set of registers can contain indirect register source operands, and only a limited set of instructions employ indirect register access. In another further embodiment, at least some indirectly accessible data registers are not directly accessible.

In accordance with another preferred embodiment of the invention, there is disclosed a data processing apparatus. The apparatus comprises a data register file comprising a plurality of registers, each of the plurality of registers accessed by a corresponding register number, at least one functional unit connected to the register file, at least one indirect register access instruction comprising a destination register number field and executable by the functional unit, and instruction decode circuitry connected to the register file and the functional unit. The instruction decode circuitry is responsive to the indirect register access instruction to recall data stored in a destination register specified by the destination register number in the instruction, identify the recalled data as a register access number, and store output data from the functional unit in a data register corresponding to the register access number.

An advantage of the inventive concepts is that the apparatus may more quickly execute table look up intensive algorithms, such as variable length decoding, than an apparatus employing only indirect memory addressing.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 2 is a top-level block diagram of a DSP cluster from the microprocessor of FIG. 1;

FIG. 3 is a chart of the resource availability and register file access for the datapath unit groups in the DSP cluster of FIG. 2;

FIGS. 5a, 5b, 5c, 5d and 5e are charts illustrating the functions of each stage of the pipelines of FIG. 4;

FIG. 8 is a block diagram of the fetch unit of the DSP core of FIG. 2;

FIG. 15 is a chart of the basic assembly format for DSP core instructions;

FIG. 16 is a temporal block diagram of selected pipeline stages for a processor instruction employing indirect register access;

FIG. 17 is a temporal block diagram of selected pipeline stages for several processor instructions; and FIG. 18 is a block diagram of a register file containing directly and indirectly accessible registers.

DETAILED DESCRIPTION OF THE PREFERRED EMBODIMENTS

Figure 1:
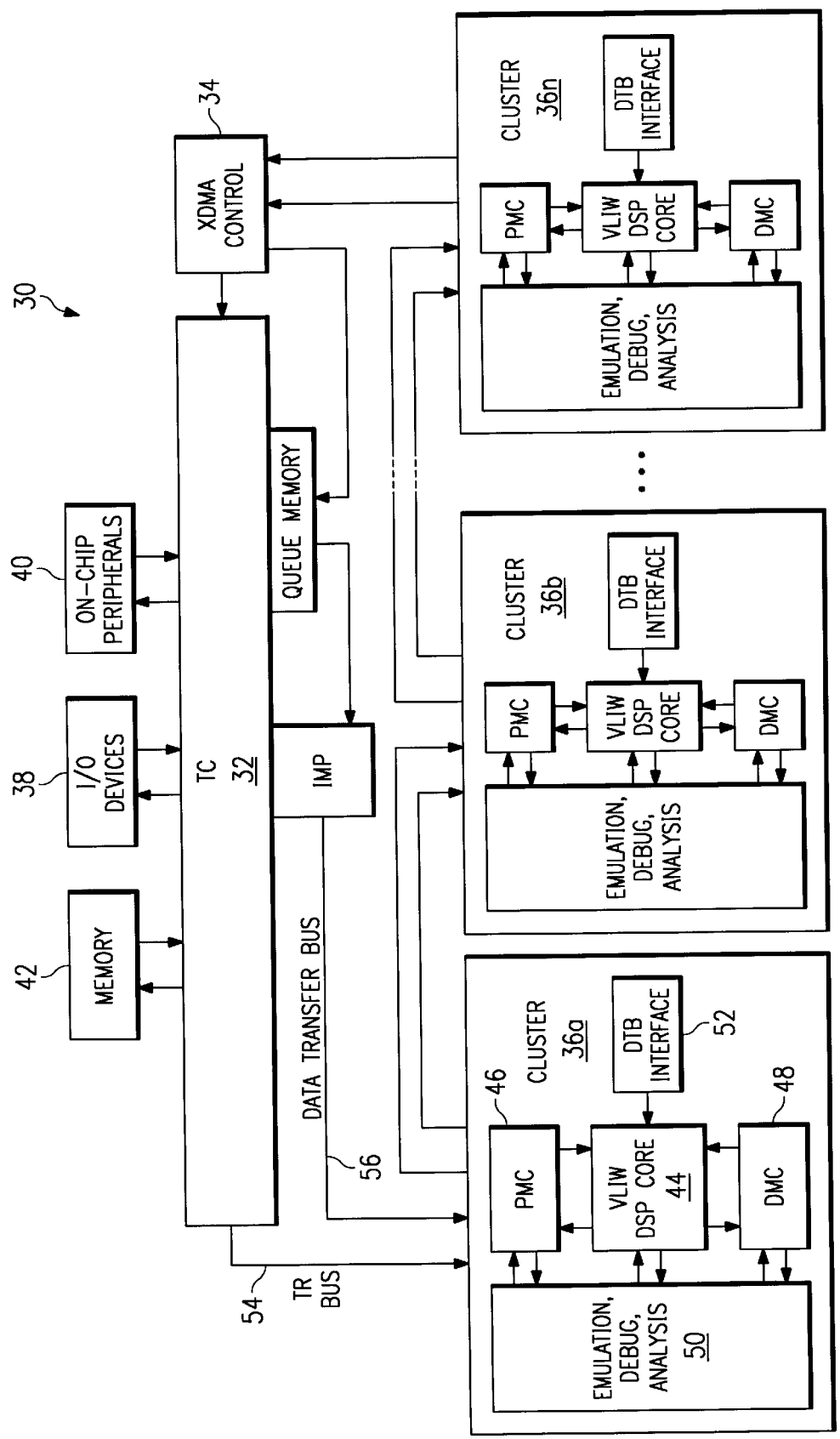
FIG. 1 is a top-level block diagram of a microprocessor.

According to a preferred embodiment of the present invention, a microprocessor architecture is provided including certain advantageous features. FIG. 1 is a high-level block diagram of an exemplary microprocessor in which a preferred embodiment of the invention is presented. In the interest of clarity, FIG. 1 shows only those portions of microprocessor 30 that may be relevant to an understanding of an embodiment of the present invention. Details of the general construction of microprocessors are well known, and may be found readily elsewhere. For example, U.S. Pat. No. 5,072,418 issued to Frederick Boutand, et al., describes a DSP in detail and is incorporated herein by reference. Details of portions of microprocessor 30 relevant to an embodiment of the present invention are explained in sufficient detail below so as to enable one of ordinary skill in the microprocessor art to make and use the invention.

Generally, microprocessor 30 comprises Transfer Controller (TC) 32, External Direct Memory Access (XDMA) Controller 34, and DSP clusters 36a–36n. Transfer Controller 32 provides for all data communication among DSP clusters 36a–36n, external input/output (I/O) devices 38, on-chip peripherals 40, and memory 42. While any given cluster such as DSP cluster 36a can access its own internal local memory within the cluster without permission from TC 32, any access to global memory outside of its local memory requires a TC directed data transfer, whether the access is to external memory or to another DSP cluster's own local memory. XDMA Controller 34 provides handling of externally initiated DMA requests while avoiding interrupting any DSP clusters 36a–36n. Each DSP cluster 36 comprises a very long instruction word (VLIW) DSP core 44, Program Memory Controller (PMC) 46, Data Memory Controller (DMC) 48, an emulation, analysis and debug block 50, and Data Transfer Bus (DTB) interface 52. DSP clusters 36 and TC 32 communicate over a pair of high throughput buses: Transfer Request. (TR) bus 54, which is used to specify and request transactions in TC 32, and DTB 56, which is used to load and store data from objects in the global memory map. The overall architecture is scaleable, allowing for the implementation of up to 255 DSP clusters 36, although three DSP clusters 36 is currently the preferred embodiment. It should be noted that architectural details, such as the number of DSP clusters 36, and instruction set details are not essential to the invention. The microprocessor architecture outlined in FIG. 1 is exemplary only, and the invention is applicable to many microprocessor architectures.

FIG. 2 is a high-level block diagram illustrating more detail of DSP core 44. DSP core 44 is a 32-bit eight-way VLIW pipelined processor. The instruction set consists of fixed length 32-bit reduced instruction set computer (RISC) type instructions that are tuned for DSP applications. Almost all instructions perform register-to-register operations, and all memory accesses are performed using explicit load/store instructions. As shown in FIG. 2, instruction pipeline 58 consists of fetch stage 60 and decode stage 62. Fetch stage 60 retrieves program codes into the processor core from instruction cache 64 in groups of eight instructions called a fetch packet. Decode stage 62 parses the fetch packet, determines parallelism and resource availability, and constructs an execute packet of up to eight instructions. Each instruction in the execute packet is then translated into control signals to drive the appropriate units in execution pipeline 66. Execution pipeline 66 consists of two symmetrical datapaths, datapath A 68 and datapath B 70, a common 64-bit load/store unit group, D-unit group 72, and a common branch unit group, P-unit group 74. Each datapath contains 32-word register file (RF) 76, and four execution unit groups, A-unit group 78, C-unit group 80, S-unit group 82, and M-unit group 84. Overall there are ten separate unit groups in execution pipeline 66, of which eight may be scheduled concurrently every cycle. Each functional unit group contains plural functional units, some of which are duplicated between unit groups. In total there are nine 32-bit adders, four 32-bit shifters, three Boolean operators, and two 32×16 multipliers. The multipliers are each configurable into two 16×16 or four 8×8 multipliers.

FIG. 3 is a chart summarizing the resource availability and register accessibility for all of the functional unit groups in execution pipeline 66. Upon receiving control signals from decode stage 62, source operands are read from register file(s) 76 and sent to the execution unit groups. A summary of the types of operations performed by each unit group are listed in the Operations column in FIG. 3. The unit groups' access to the two register files in DSP core 44 is summarized in the Register File Access column in FIG. 3. Each datapath-specific unit group has direct read-access to its own register file (primary datapath), and may also read the other register file (alternative datapath) via read-only crosspath 86, shown in FIG. 2. The execution unit groups then carry out the operations and write back the results into their respective register file. There is no write access to the other datapath's register file for the datapath-specific unit groups. D-unit group 72 performs address computation, and has read/write access to both register files 76 and interfaces with data cache/random access memory (RAM) 88 via a 32-bit address bus and 64-bit data bus. P-unit group 74 handles branching and other program control flow, and has read access to both register files 76.

Figure 4:
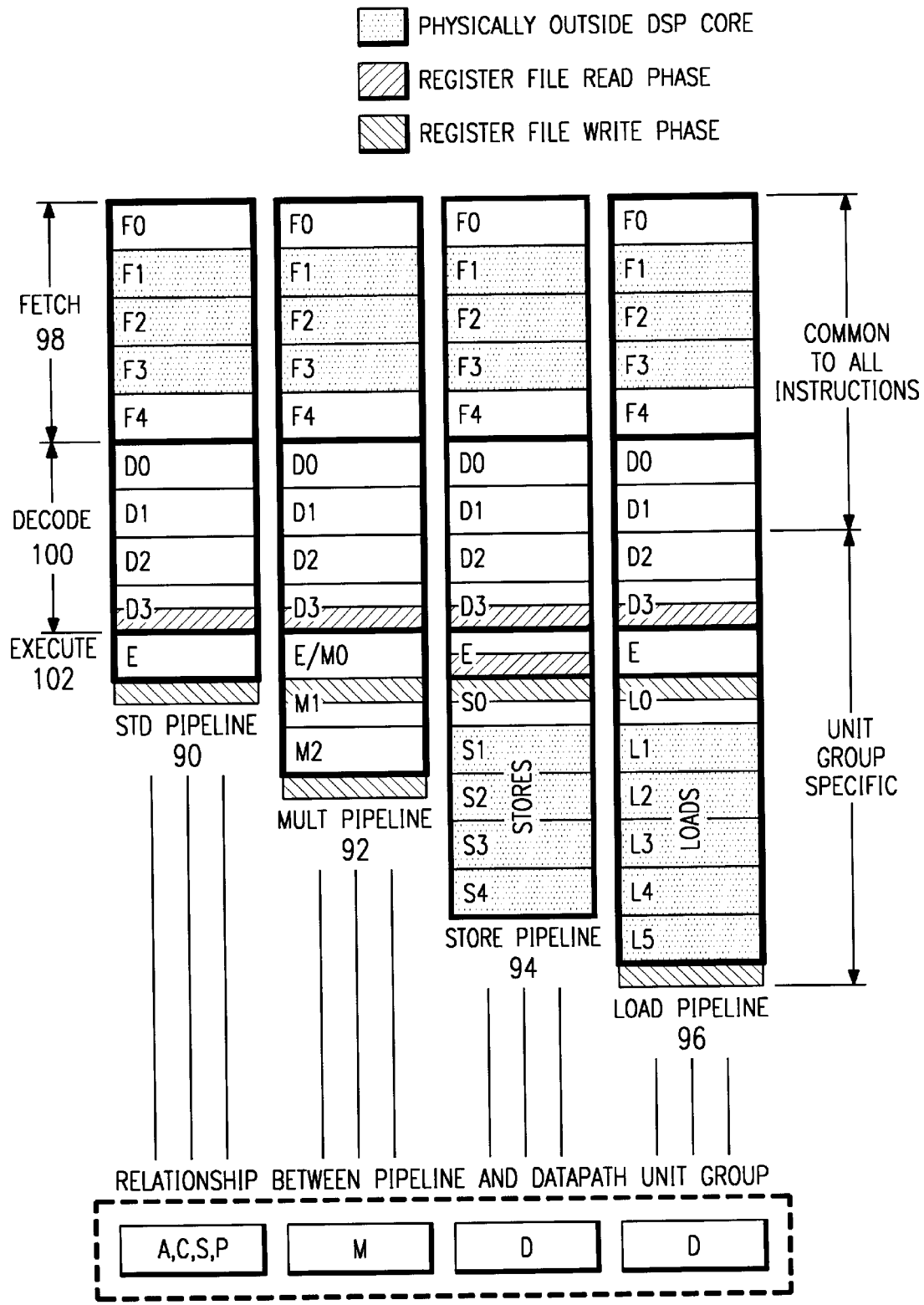
FIG. 4 is a chart of the DSP pipeline depth of the DSP core within the DSP cluster of FIG. 2.

DSP core 44 of FIG. 2 comprises a deep pipeline with minimal hardware logic control, thus facilitating high clock speeds and high data throughput, and providing a high degree of instruction execution control at the programming level. The DSP hardware does not manage data dependencies (e.g., read-before-write, write collision, etc.), therefore it is the compiler's or assembler's responsibility to take delay-slot requirements into account in instruction scheduling. FIG. 4 illustrates the four pipeline types utilized by DSP core 44: standard pipeline 90, used by the A-, C-, S-, and P-unit groups; multiply pipeline 92, used by the M-unit group; store pipeline 94, used by the D-unit group; and load pipeline 96, also used by the D-unit group. The pipeline depth varies from 10 stages for standard pipeline 90, to 13 stages for multiply pipeline 92, to 15 stages for store pipeline 94, and up to 16 stages for load pipeline 96. An operation advancing down the pipeline advances one stage every CPU cycle, which refers to the period during which an execute packet occupies any given execute stage. A CPU cycle equates to a clock cycle when there are no stalls. Conceptually, the DSP pipeline may be partitioned into two main pipelines, the instruction pipeline and the execution pipeline. The instruction pipeline is common to all instructions and includes the 5-stage instruction fetch function 98, and the 4-stage decode/dispatch function 100. The depth and functionality of execution pipeline 102 is instruction dependent. For example, non-multiply operations performed in the M-unit group do not require the deep pipeline necessary for multiply operations, so the results of these operations are available for write-back in stage M1. Similarly, the results of address math operations performed in the D-unit group are written to the register file at the end of stage E. Thus, even though these example instructions are performed by the M- and D-unit groups, respectively, their pipelines appear to be that of the standard pipeline.

Charts outlining the functions of each pipeline stage are shown in FIGS. 5a–5e. Fetch stages F0–F4 are listed in FIG. 5a. Most fetch stages occur outside the DSP core itself. Stage F0 initiates the fetch cycle by sending the program counter (PC) value to PMC 46. Stages F1, F2 and F3 occur outside DSP core 44 in PMC 46, with the new fetch packet being received by DSP core 44 at the end of stage F4. FIG. 5b lists decode stages D0–D3. Stages D0 and D1 are common to all execution unit groups and operate on every instruction executed by DSP core 44. Stage D0 determines the validity of instructions in the current fetch packet and determines the next fetch packet. Stage D1 sorts the current execution packet instructions by unit group. The current execution packet is then sent to the destination pipeline/unit group during stage D2. In stage D3, units decode received instructions, unit level control signals are generated, and register file access is performed.

The P-unit group is not datapath specific, but the branching pipeline operates like the A-, C-, and S-unit groups in that it has a single execution stage, with data being written to the program counter in the same write phase as the standard pipeline. The program counter is updated at the end of stage E, implying that the next CPU cycle will be stage F0 for the new address. This means that from the point a branch instruction is in stage E, there are ten CPU cycles until execution begins with instructions from the new address.

FIG. 5c lists execution stages E and M0–M2. Execution for non-multiply operations is performed in a single execute cycle, E. These include non-multiply arithmetics, Boolean operations, shifts, packs/unpacks, and address calculations. An extended execution pipeline, stages M0–M2, is provided for multiply operations due to their complexity. Functionally, stage M0 corresponds to stage E. Stages M1–M2 are required by the time necessary to perform a worst case 32 bit×16 bit multiply. The increased latency forces three delay slots on multiply operations. M-unit group 84 performs all multiply operations. Additionally, M-unit group 84 performs a few non-multiply instructions, which complete in stage M0.

FIG. 5d lists load stages L0–L5, and FIG. 5e lists store stages S0–S4. D-unit group 72 which performs these operations is not datapath specific, so datapaths A 68 and B 70 share a single load/store interface between them. Load/store operations are up to 64 bits wide and may reference the register file of either datapath. Address calculations for load/store operations complete in stage E. The generated address is then sent to DMC 48 in stage L0/S0. The load and store stages begin to differ at this point. For data loads, address decode takes two stages, L1 and L2. Address and data phases of data cache access occur in stages L3 and L4, and then read data is sent to DSP core 44 in stage L5 to complete the load. For data stores, address decode takes one stage, S1. Write data is sent to DMC 48 in stage S2, and then address and data phases of data cache access occur in stages S3 and S4 to complete the store.

Figure 6A:
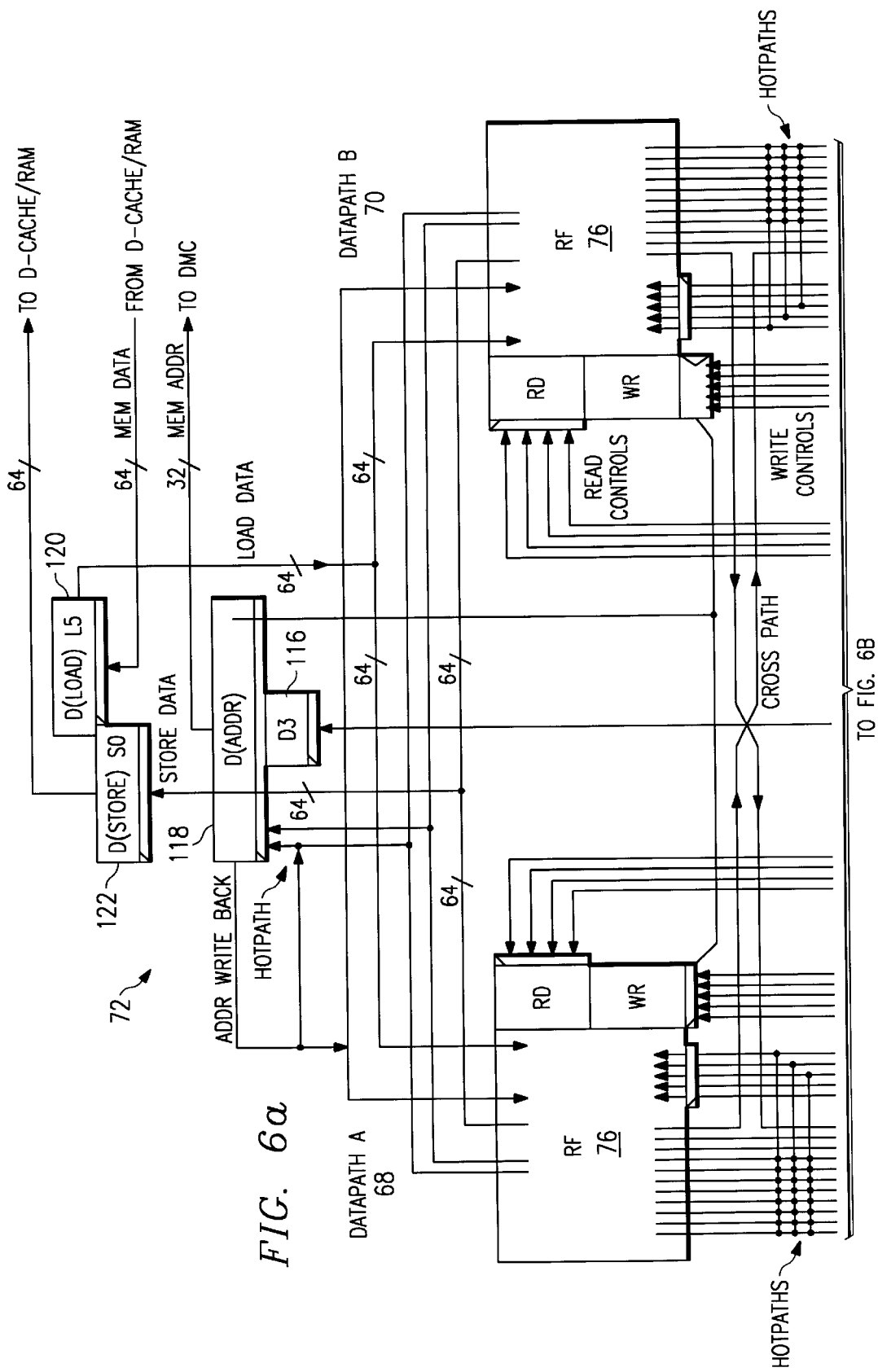
FIGS. 6a and 6b are a block diagram of the top-level buses of the pipeline of the DSP core of FIG. 2.
Figure 6B:
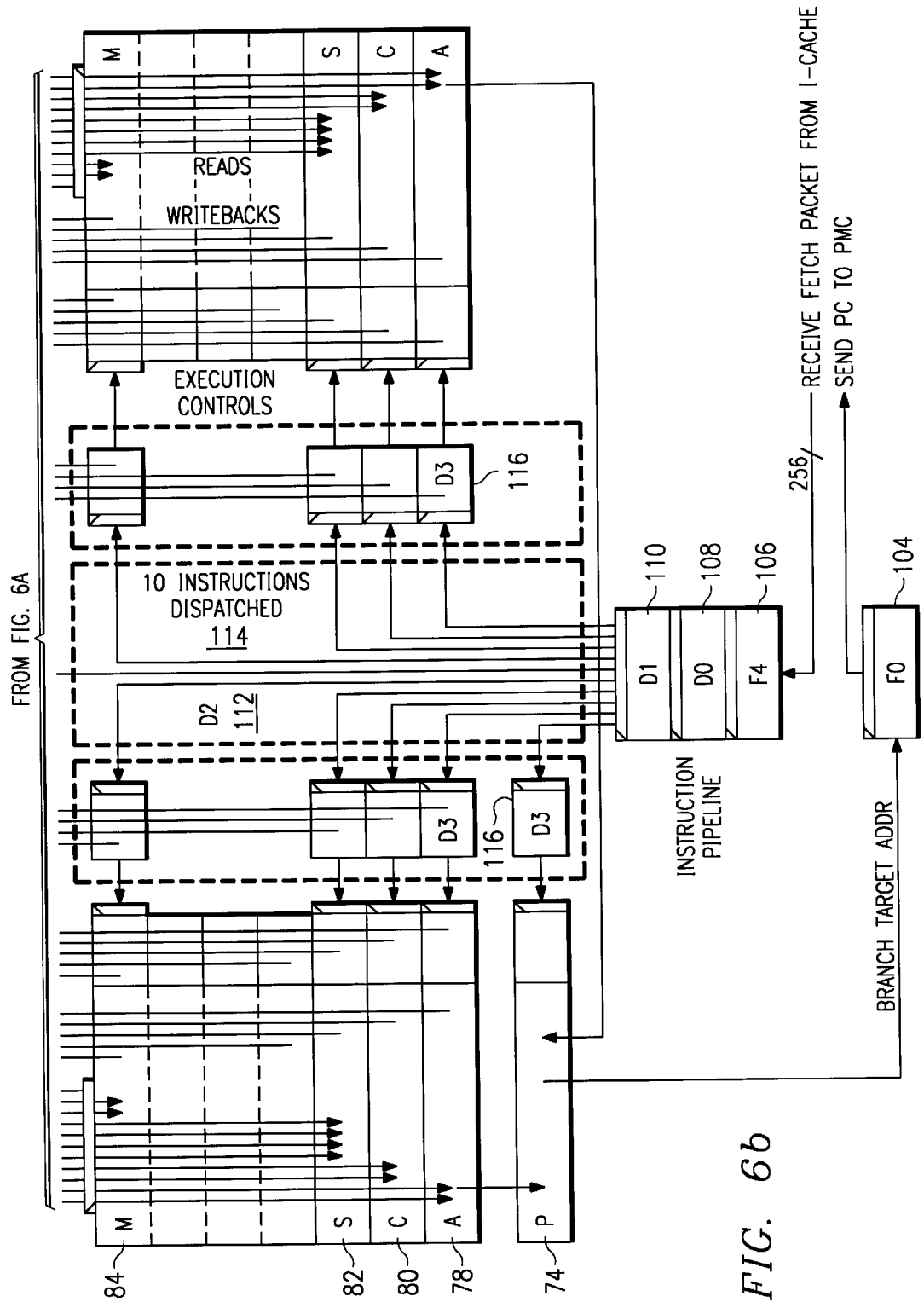
Figure 7:
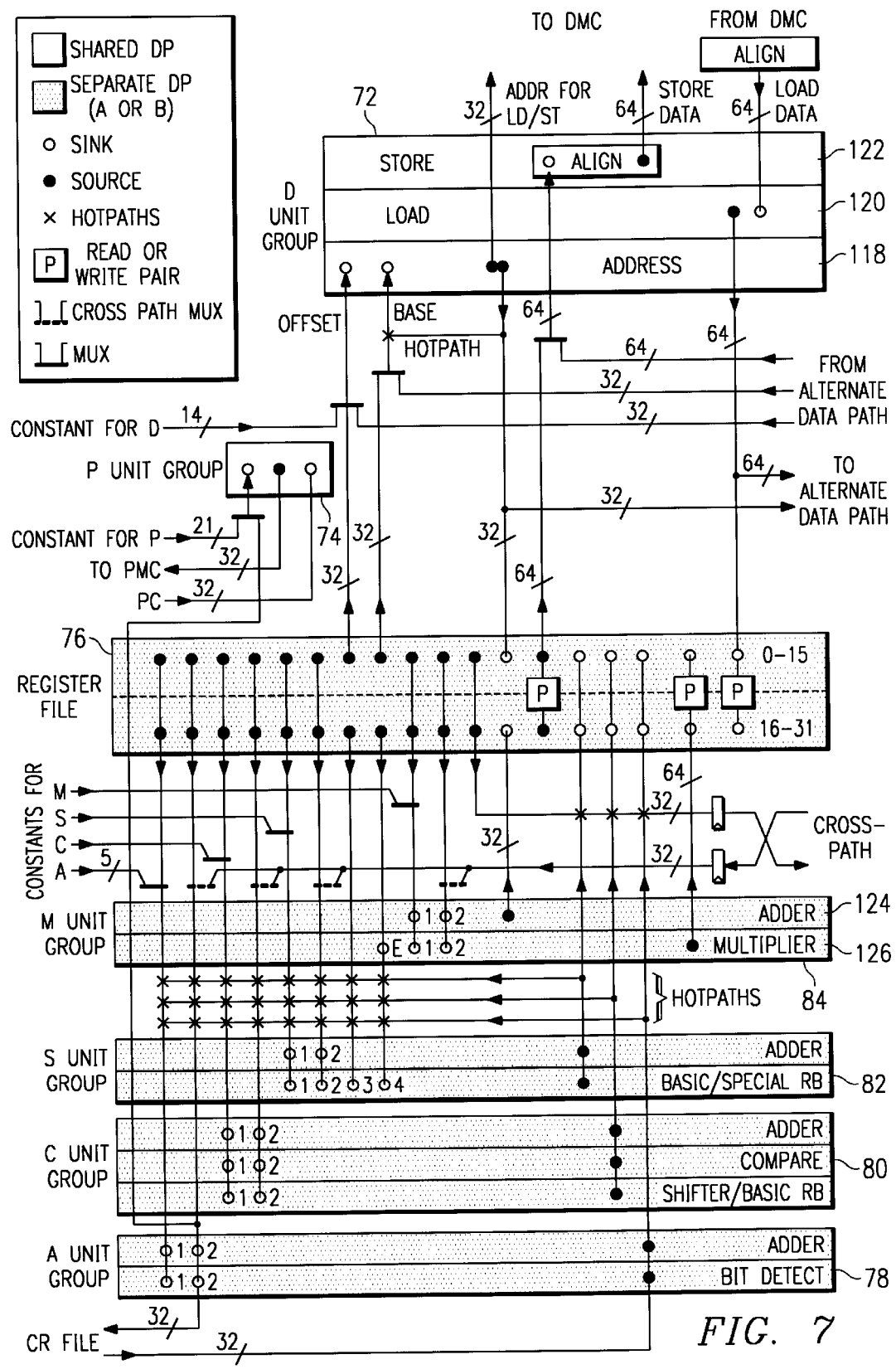
FIG. 7 is a block diagram of the datapath in the execution pipeline of the DSP core of FIG. 2.

FIGS. 6a, 6b and 7 illustrate the functionality of the instruction and execution pipelines in more detail. FIGS. 6a and 6b are the two halves of a block diagram of the top-level buses of the DSP core pipeline. The instruction pipeline, serving as the front end of DSP core 44, fetches instructions into the processor from PMC 46 and feeds the execution engines. Stage F0 104 resides in DSP core 44, and contains the program counter and branching control. Stages F1, F2 and F3 (not shown) reside in PMC 46, where memory addresses are decoded and cache accesses are performed. Stage F4 106 is reserved solely for the transport of the 256-bit fetch packet from PMC 46 to the DSP core 44. Stages D0 108 and D1 110 are used to parse the fetch packet and to assign individual 32-bit instructions to appropriate execute unit groups. Stage D2 112 is reserved solely for the transport of these instructions to the execute unit groups. There are physically 10 instruction buses 114 sent to stage D3 116, which are distributed locally to the execute unit groups: one bus to each A- 78, C- 80, S- 82, and M-unit group 84, in each datapath 68 and 70, one bus to P-unit group 74, and one bus to D-unit group 72. Only a maximum of 8 instructions, however, may be dispatched to the execute pipeline in a given cycle. Stage D3 116 houses the final decoders which translate instruction opcodes into specific control signals to drive the respective execute unit groups. Stage D3 116 is also where register file 76 is accessed for operands.

Continuing from stage D3 116, the execute pipeline splits off into the two main datapaths, A 68 and B 70, each containing four execute unit groups, A 78, C 80, S 82, M 84, and register file 76. A unit group 78, C unit group 80, and S unit group 82 are 32-bit datapath hardware that perform single-cycle general arithmetic, shifting, logical and Boolean operations. M unit group 84 contains 2 functional units: a single-cycle 32-bit adder and a three-stage 64-bit multiplier. The execute pipeline also contains D unit group 72 and P unit group 74, each of which serves both datapaths.

D-unit group 72 has 3 functional units: single-cycle 32-bit address generator 118, 64-bit load unit 120 and 64-bit store unit 122. Address generator 118 functions in the pipeline as an execute unit similar to the A, C and S unit groups. Load unit 120 has 6 pipeline stages. Memory addresses computed by address generator 118 and load commands are formatted by load unit 120 and sent to DMC 48 in stage L0. DMC 48 uses stages L1, L2, L3 and L4 to decode memory addresses and perform cache access. Data alignment and zero/sign extension are done in stage L4. Stage L5 is reserved solely for data transport back to DSP core 44. Store unit 122 has 5 pipeline stages. Similar to load unit 120 operation, addresses and store commands are sent to DMC 48 in stage S0. The data to be stored is read out from register file 76 one cycle earlier in stage E, at the same time the address is being generated. The store data is also sent to DMC 48 in the same cycle as addresses and commands in stage S0. DMC 48 uses stages S1, S2, S3 and S4 for address decode and cache access for storing data.

P-unit group 74 performs branch computation and is a special case. With respect to timing, P-unit group 74 resides in the execute pipeline just like the single cycle units A 78, C 80 and S 82. However, since the program counter and control registers are located within the fetch unit in stage F0 104, P-unit group 74 resides physically with the fetch unit.

FIG. 7 is a detailed block diagram of the execute pipeline datapath. For clarity, the structure and interconnection between shared D-unit group 72 and shared P-unit group 74 and only one of the two separate main datapaths (A-unit group 78, C-unit group 80, S-unit group 82, M-unit group 84) are described. As instructions arrive at stage D3 of the instruction pipeline, decode logic peels off source and destination register addresses for each of the execute unit groups and sends them to RF 76 to fetch operands. In case of instructions with cross-file operands, RF access is performed a cycle earlier in stage D2, and stage D3 is used for cross-file transport. In stage D3, the instruction opcode is also decoded into control signals. At the end of stage D3, operand data and control signals are set-up to be sent to the respective execute unit groups.

Register file 76 is constructed of 2 banks of sixteen 32-bit registers each. There are 12 read ports and 6 write ports. In order to supply the many execute resources in the datapath while conserving read/write ports, the two read ports for base and offset of D-unit group 72 are shared with source 3 and 4 of S-unit group 82. In other words, the lower 16 registers (0–15) only go to D-unit group 72, and the upper 16 registers (16–31) only go to S-unit group 82. Similarly, the write port for the address result from D-unit group 72 is shared with the adder result from M-unit group 84. The lower 16 registers only go to D-unit group 72 and the upper 16 registers only go to M-unit group 84.

There are 3 classes of operation in the execute stages: single-cycle, 3-cycle, and load/store multi-cycle. All operations in A unit group 78, C unit group 80, and S unit group 82, the add functional unit in M-unit group 82, and address generation in D-unit group 72 are single cycle. Multiply functions in M unit group 84 take 3 cycles. Load and store operations take 6 and 5 cycles, respectively, in case of cache hit. Cycle counts are longer and variable in case of cache miss, because off-chip memory latency depends on the system configuration.

A unit group 78 and C unit group 80 each have two operand ports, source 1 and 2, while S unit group 82 has 4 operand ports, source 1, 2, 3, 4. Normal operations in S unit group 82 only uses 2 ports, while other operations such as Extended Rotate Boolean (ERB) use all 4 ports. If a condition requiring forwarding of a result from preceding instruction is detected, the forwarded result is selected, otherwise the RF operand is selected. Then the execute hardware (e.g. adder, shifter, logical, Boolean) performs the instructed operation and latches the result at the end of the E stage. The result from any one of the A, C, or S unit groups can be forwarded to the operand port of any of the A, C, or S unit groups within the same datapath. Address generator 118 in D unit group 72 operates similarly to the A, C, and S unit groups, except that D unit group's address result is only hotpathed back to itself. Adder 124 in M unit group 84 is similar, except that it has no hotpath. M unit group 84 has 3 operand ports. Normal multiplication uses 2 sources, while the extended port, which is shared with source 4 of S unit group 82, is used for Extended Multiply (EMPY) instructions. Multiplier 126 in M unit group 84 has 3 pipeline stages and no hotpath. The first 2 stages perform array multiplication in a carry/sum format. The last stage performs carry propagate addition and produces up to a 64-bit result. The 64-bit result is written back to RF 76 in pairs. Galois multiply hardware resides in M-unit group 84 alongside the main multiplier array, and it also takes 3 cycles. P unit group 74 operates just like the A, C, and S unit groups, except that it has no hotpath and that its result is consumed by the program control logic in the fetch unit instead of being written back to RF 76. P unit group 74 only has one operand port which is shared with source 2 of A unit group 78, which precludes parallel execution of a branch instruction and any instruction in A unit group 78.

FIGS. 8 to 14 are block diagrams illustrating more detail of the operation and hardware configuration of each of the unit groups within the DSP core. FIG. 8 is a top level diagram of fetch unit 60, which consists primarily of Program Counter 126 and other components generally responsible for controlling program flow, and the majority of control registers not directly related to the operation of a specific unit. With respect to program flow, fetch unit 60 has two main modes of operation: normal (sequential) operation and branch operation. Additionally, fetch unit 60 must initiate any interrupt/exception handling, resets, and privilege-level changes for DSP core 44.

Figure 9:
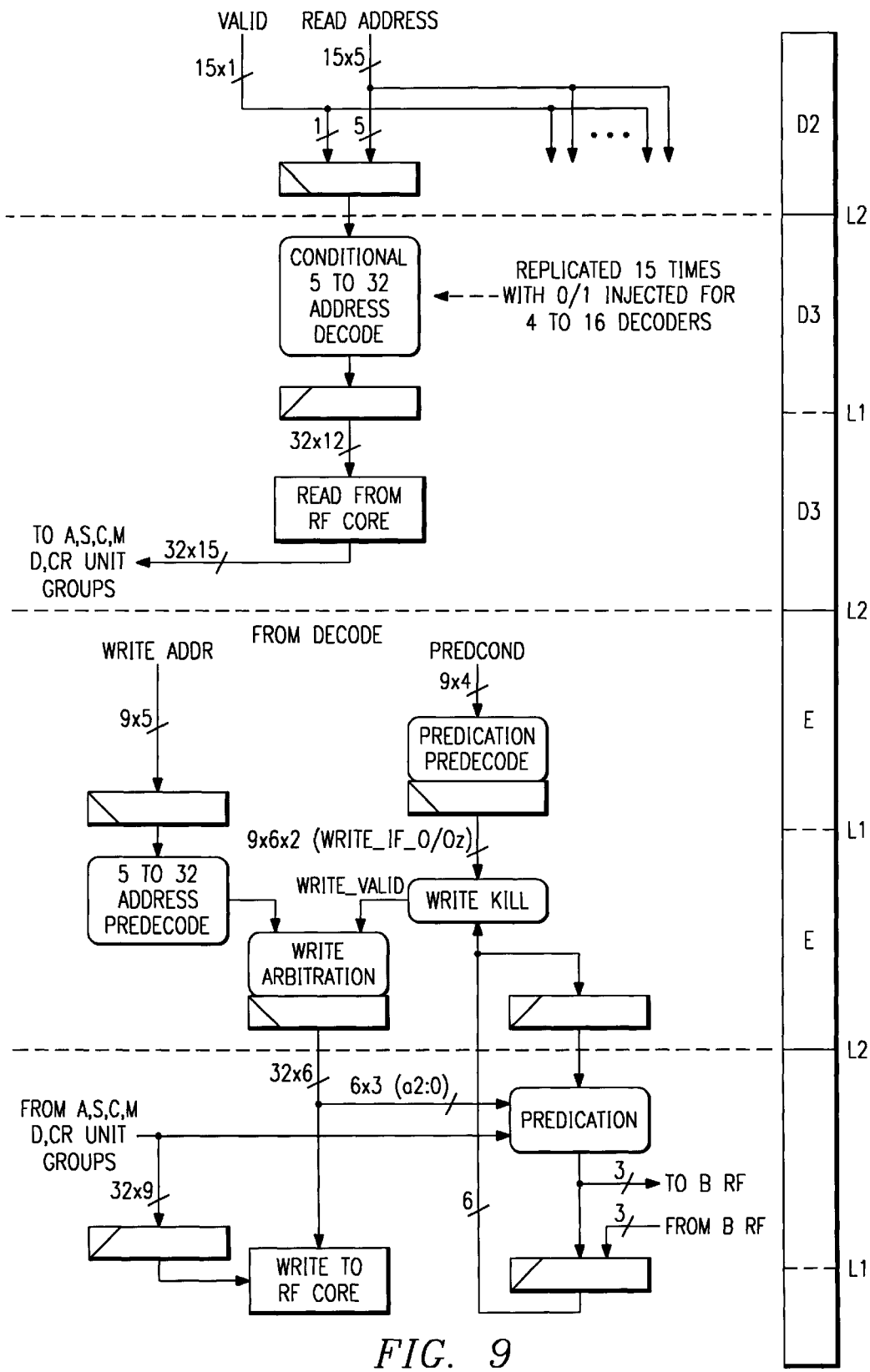
FIG. 9 is a block diagram of a register file of the DSP core of FIG. 2.

FIG. 9 is a top-level temporal block diagram of Register File 76. Within each DSP core 44 there are two datapaths, A 68 and B 70, each containing an identical register file. As used herein, the registers in the A (B) datapath are denoted by a0, . . . , a31 (b0, . . . , b31). Each register file 76 is composed of thirty-two 32-bit registers configured in upper and lower banks of 16 registers each. There are 12 read ports and 6 write ports for each register file 76.

Figure 10:
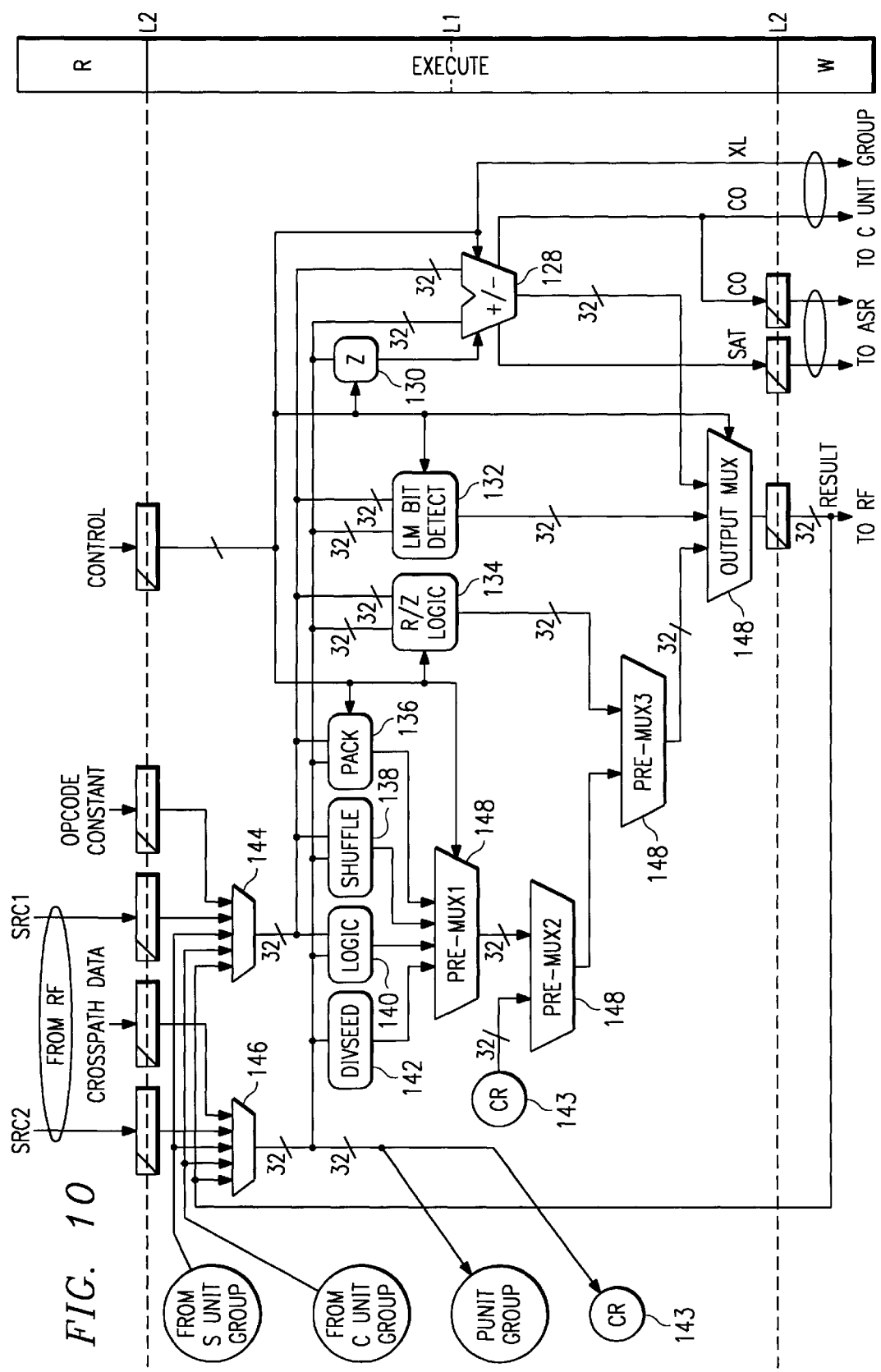
FIG. 10 is a block diagram of an A execution unit group of the DSP core of FIG. 2.

FIG. 10 is a top level block diagram of A unit group 78, which supports a portion of the arithmetic and logic operations of DSP core 44. A unit group 78 handles a variety of operation types requiring a number of functional units including A adder unit 128, A zero detect unit 130, A bit detection unit 132, A R/Z logic unit 134, A pack/replicate unit 136, A shuffle unit 138, A generic logic block unit 140, and A div-seed unit 142. Partitioning of the functional sub-units is based on the functional requirements of A unit group 78, emphasizing maximum performance while still achieving low power goals. There are two input muxes 144 and 146 for the input operands, both of which allow routing of operands from one of five sources. Both muxes have three hotpath sources from the A, C and S result busses, and a direct input from register file 76 in the primary datapath. In addition, src1 mux 144 can pass constant data from decode unit 62, while src2 mux 146 provides a path for operands from the opposite datapath. Result mux 148 is split into four levels. Simple operations which complete early in the clock cycle are pre-muxed in order to reduce loading on the critical final output mux. A unit group 78 is also responsible for handling control register operations 143. Although no hardware is required, these operations borrow the read and write ports of A unit group 78 for routing data. The src2 read port is used to route data from register file 76 to valid configuration registers. Similarly, the write port is borrowed to route configuration register data to register file 76.

Figure 11:
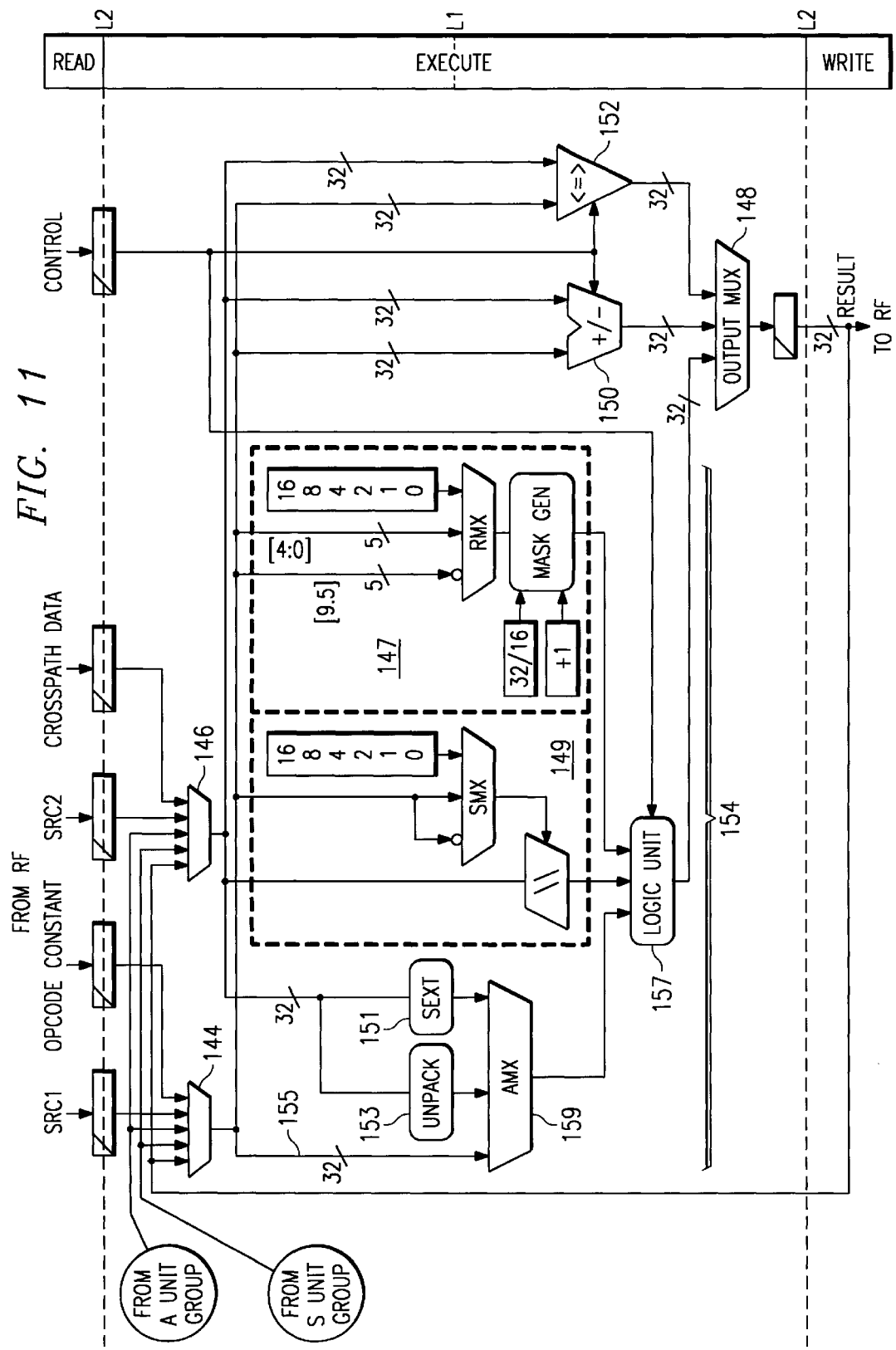
FIG. 11 is a block diagram of a C execution unit group of the DSP core of FIG. 2.

FIG. 11 is a top level block diagram of C unit group 80, which executes a subset of the arithmetic and logical operations of DSP core 44. Src1 input mux 144 and src2 input mux 146 perform the same functions as the input muxes in A unit group 78. C unit group 80 has three major functional units: C adder unit 150, C comparator unit 152 and C rotate/Boolean unit 154. C rotate/Boolean functional unit 154 includes C mask generator unit 147, C shifter unit 149, C sign-extension unit 151, C unpack unit 153, C move unit 155 and C logical unit 157. Like A unit group 78, the functional units of S unit group 80 are efficiently partitioned to achieve maximum performance while minimizing the power and area requirements. C Amx mux 159 selects an output from sign-extension unit 151, C unpack unit 153 or C move unit 155 for forwarding to C logical unit 157. Outputs from C mask generator unit 147 and C shifter unit 149 are also forwarded to C logical unit 157. Finally, result mux 148 selects an output from one of the three major functional units, C adder unit 150, C comparator unit 152 and C rotate/Boolean unit 154, for forwarding to register file 76.

Figure 12:
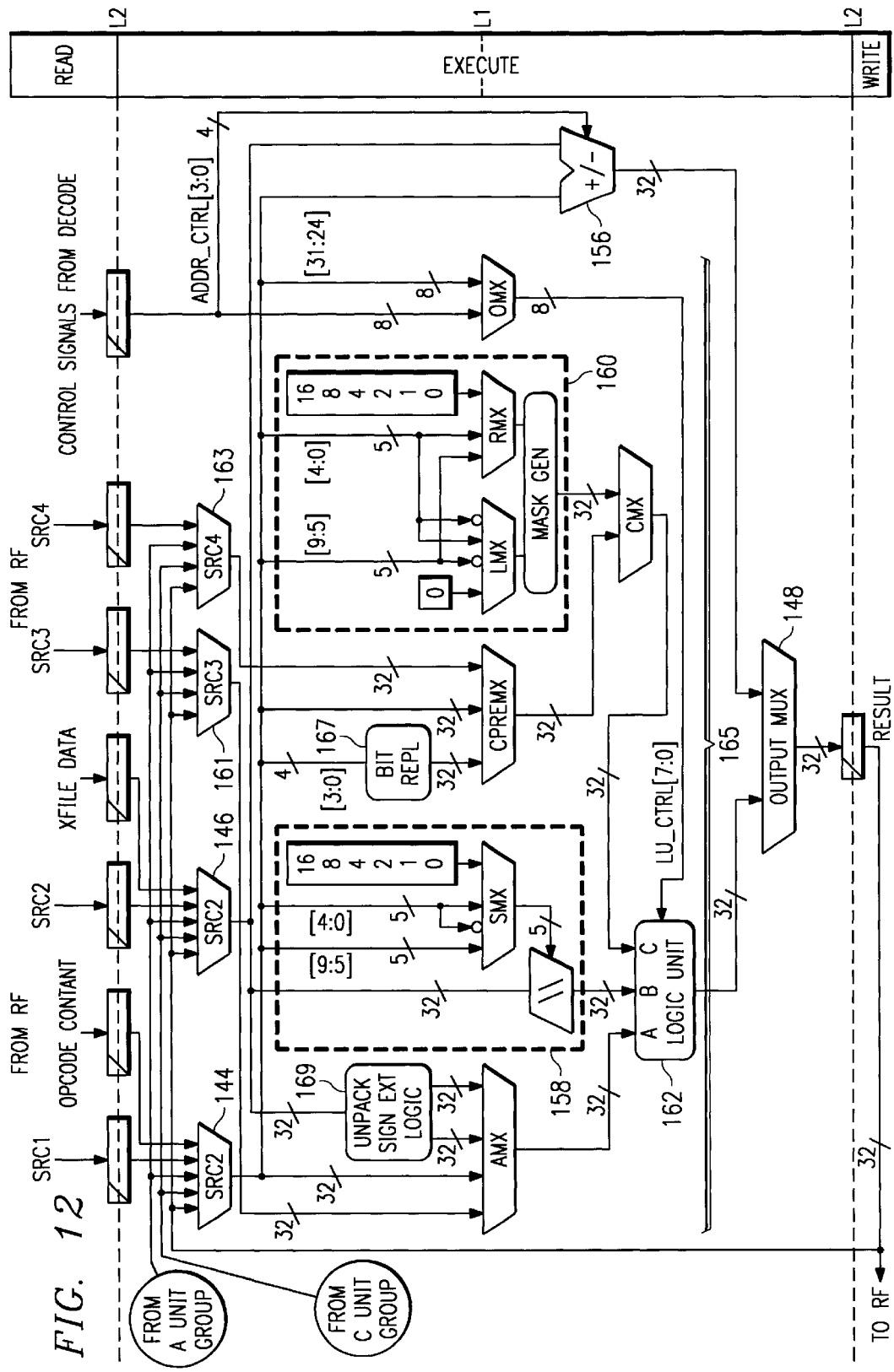
FIG. 12 is a block diagram of a D execution unit group of the DSP core of FIG. 2.

FIG. 12 is a top level block diagram of S unit group 82, which is optimized to handle shifting, rotating, and Boolean operations, although hardware is available for a limited set of add and subtract operations. S unit group 82 is unique in that most of the hardware can be directly controlled by the programmer. S unit group 82 has two more read ports than the A and C unit groups, thus permitting instructions to operate on up to four source registers, selected through input muxes 144, 146, 161, and 163. Similar to the A and C unit groups, the primary execution functionality is performed in the Execute cycle of the design. S unit group 82 has two major functional units: 32-bit S adder unit 156, and S rotate/Boolean unit 165. S rotate/Boolean unit 165 includes S rotator unit 158, S mask generator unit 160, S bit replicate unit 167, S unpack/sign extend unit 169, and S logical unit 162. The outputs from S rotator unit 158, S mask generator unit 160, S bit replicate unit 167, and S unpack/sign extend unit 169 are forwarded to S logical unit 162. The various functional units that make up S rotate/Boolean unit 165 can be utilized in combination to make S unit group 82 capable of handling very complex Boolean operations. Finally, result mux 148 selects an output from one of the two major functional units, S adder unit 156 and S rotate/Boolean unit 165, for forwarding to register file 76.

Figure 13:
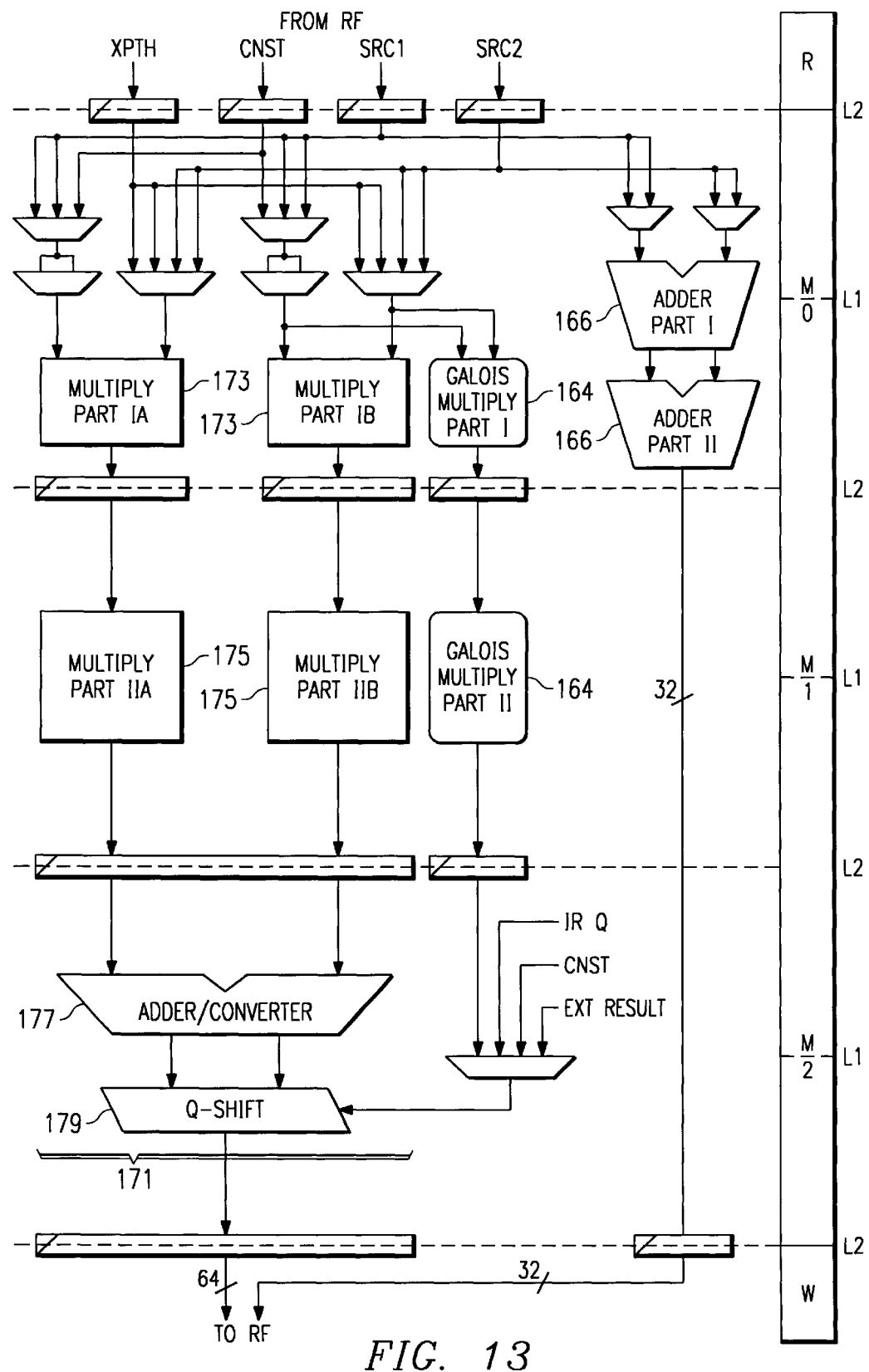
FIG. 13 is a block diagram of an M execution unit group of the DSP core of FIG. 2.

FIG. 13 is a top level block diagram of M unit group 84, which is optimized to handle multiplication, although hardware is available for a limited set of add and subtract operations. M unit group 84 has three major functional units: M Galois multiply unit 164, M adder unit 166 and M multiply unit 171. While M adder unit 166 can complete its operations within the Execute cycle, the other two units require two additional cycles to complete the multiply operations. In general, M multiply unit 171 can perform the following operations: two 16×16 multiplies or four 8×8 multiplies with all combination of signed or unsigned numbers, Q-shifting and A-shifting of multiply results, rounding for extended multiply (EMPY) instructions, controlling the carry chain by breaking/joining the carry chain at 16-bit block boundaries, and saturation multiplication where the final result is shifted left by 1 or returns 0x7FFFFFFF if an overflow occurs. Multiplication is broken down into three stages, starting with Multiply Parts IA & IB 173, which provide the inputs for Multiply Parts IIA & B 175, followed by the final stage which contains Adder/Converter 177 and Q-shift 179. M Galois multiply unit 164 performs Galois multiply in parallel with M multiply unit 171. For output from M unit group 84, the Galois multiply result is muxed with the M multiply result. M adder unit 166 is only lightly coupled to the other units in M unit group 84: it shares read port, but has a dedicated write port, making it possible for both a multiply and an add instruction to write results in the same cycle from M unit group 84.

Figure 14:
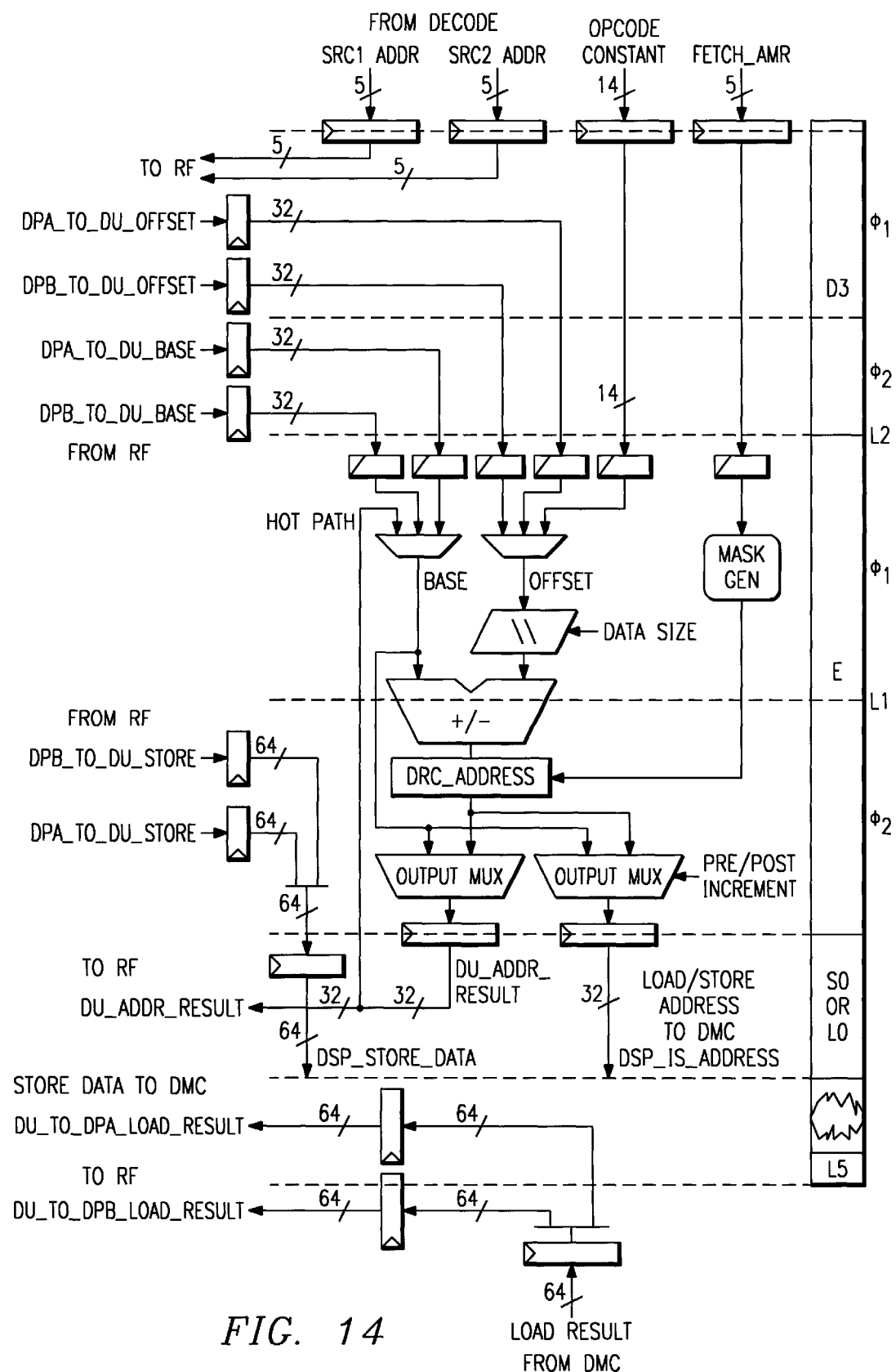
FIG. 14 is a block diagram of the D execution unit group of the DSP core of FIG. 2.

FIG. 14 is a top level block diagram of D group unit 72, which executes the load/store instructions and performs address calculations. D unit group 72 is shared between the two datapaths A 68 and B 70, and can reference the register files 76 of both datapaths. D unit group 72 also interfaces with Data Memory Controller 48. Load and Store instructions operate on data sizes from 8 bits to 64 bits. The different addressing modes supported by D unit group 72 are basic addressing, offset addressing, indexed addressing, auto-increment/auto-decrement, long immediate addressing, and circular addressing. In basic addressing mode, the content of a register is used as a memory address. In offset addressing mode, the memory address is determined by two values, a base value and an offset that is either added or subtracted from the base. The base value always comes from an address register, whereas the offset value may come from either an address register or a 5-bit unsigned constant contained in the instruction. Index addressing mode functions the same as offset addressing mode, except that the offset is interpreted as an index into a table of bytes, half-words, words or double-words, as indicated by the data size of the load or store operation. In auto-increment/decrement addressing mode, the base register is incremented/decremented after the execution of the load/store instruction. There are two sub-modes, pre-increment/decrement, where the new value in the base register is used as the load/store address, and post-increment/decrement where the original value in the register is used as the load/store address. In long-immediate addressing mode, a 14-bit unsigned constant is added to a base register to determine the memory address. In circular addressing mode, the base register along with a block size define a region in memory. To access a memory location in that region, an new index value is generated from the original index modulo the block size.

The address calculation for load/store operations is performed during the Execute stage of the pipeline, and the address write-back occurs in the phase1 of the next clock cycle. The newly calculated address value is also forwarded using a hot path, back to phase1 of E stage, which allows zero delay slot execution for back to back address calculations. The load/store address is calculated and passed onto DMC 48 after pipeline stage E. Results of a load are available from DMC 48 after 6 cycles in pipeline stage L5. The load operation has six delay slots. Data for store is supplied to DMC 48 in pipeline stage S0 along with the calculated address for the store location. FIG. 14 illustrates the different interconnections to register file 76 for fetching the operands from the two datapaths A 68 and B 70, getting the data for the store, and sending the results of address calculations and load operations to both datapaths. FIG. 14 approximately shows the relative pipeline stages during which the address results are computed and load/store data is received and sent, respectively.

FIG. 15 is a chart of the basic assembly format for DSP core 44 instructions, along with examples for each functional unit group. The '|||' notation is used in optimized/ scheduled assembly to indicate that an instruction is scheduled in the same execute packet with the preceding instruction(s). For example, in the following sequence, instructions (1) through (6) are scheduled in the same execute packet, and should execute simultaneously, although all six instructions will not complete at the same time.

```
   ADD  .A1 A1,A2,A3;(1)
|| SUB  .C1 A4,A5,A6;(2)
|| SHL  .S1 A7,A8,A9;(3)
|| MPY  .M1 A10,A11,A12;(4)
|| ADD  .A2 B1,B2,B3;(5)
|| MPY  .M2 B4,B5,B6;(6) Instructions (1), (2),
   ;(3), (4), (5), (6) may be
   ;scheduled in the same
   ;execute packet
   SUB  .A2 B3,B2,B1;(7) Instruction (7) must be
   ;scheduled in the next execute
   ;packet because it reuses unit
   ;group A2
```

All instructions can be predicated (conditionally executed) on the value of a predication register. Assembly examples using the [predication reg] notation follow:

[A0] ADD .A1 A1,A2,A3;execute the ADD instruction
;if A0 is non-zero
[!A0]ADD .C2 B7,B8,B9;execute the ADD instruction
;if A0 is zero Because several instructions such as ADD or SUB are available in more than one unit group, the '.unit' notation is recommended when the programmer specifically wants to direct an instruction to a particular unit group. If the '.unit' notation is omitted, the compiler or assembler will automatically assign instructions to appropriate unit groups. Load, store and address instructions are only available in D-unit group 72, therefore the .D specification is redundant and optional. For the same reason, the .P specification is redundant for branch instructions in P-unit group 74.

The 'datapath' notation is also redundant and optional because the destination register implicitly specifies the datapath (note that for store instructions, the source register specifies the datapath). The 'crosspath'notation is used to indicate that one of the source operands (generally, op1 for the shift and bit-field instructions, op2 for all others; unary instructions may also use the crosspath on their operand) comes from the other datapath's register file via the crosspath.

Generally, one important aspect of designing a microprocessor architecture is providing the processor's functional units with fast data storage/retrieval so that the functional units are operating as continually as possible instead of waiting for data. As an example, highly serial algorithms such as Huffman/variable length decoding utilize lookup tables in memory, and a processor accesses the tables heavily during execution of these types of algorithm. To enhance algorithm execution, indirect memory addressing has been used to provide a pointer to the lookup table. In indirect memory addressing, a memory address is not coded in an address field in an instruction, but rather the instruction specifies a register or memory location which contains a pointer to a separate memory address containing the actual data. In this manner, the pointer stored in the register can easily be incremented or decremented (either directly or with an offset value) to move within the lookup table.

Because these algorithms are memory intensive, the access speed of the data in the lookup table significantly affects the execution time of the algorithm. Access to a processor's main memory, however, is relatively time consuming compared with the speed at which a functional unit can process the data.

According to the present invention, faster access to data can be provided by using a processor's low latency register file to store serially accessed data. Indirect register file access is then used to access the look up table stored in the register file. In indirect register file access, a register field in an instruction specifies a register which stores the register file number of another register containing the actual data. This approach has all the benefits of indirect memory addressing, but with much higher access speed. With algorithms such as variable length decoding, the look up table is generally needed to decode the entry length field of each variable length entry. This is an inherently serial process because the next variable length data word cannot be decoded or even located until the length of the current data word is known. Thus it is feasible to devote half or more of the registers in the register file to a small look up table for such decoding tasks. Generally, any register thrashing caused by the reduction in the number of registers available for general purpose tasks would be less than the amount of delay time needed to access memory instead of registers for every table look up.

In general, the register holding the indirect register number may be any one of the general purpose registers. The registers in a register file are numbered with indirect addresses from 0 to 31. The instruction specifies the register number of the register holding the indirect register address and this register is accessed to yield the register number for the operand fetch. With reference to FIG. 16, there is shown a temporal block diagram of selected pipeline stages, decode stages 168 and execute stages 170, for a processor instruction employing indirect register access. In a preferred embodiment of the present invention, the register storing the indirect register number is accessible during final decode stage d3 172. During the first phase of stage d3 172, an indirect register number read (irr) 174 occurs. The indirect register number is then available for the second phase of decode stage d3 172. This pipeline timing thus enables the operand fetch part of an indirect register file access to take place at the same timing as a direct register file access. The operand is available for use by a functional unit at the beginning of execute stage 170, as occurs in direct register file access.

FIG. 17 illustrates the setup timing for using indirect register access. Two delay slots are required between the instruction which writes to a register storing an indirect register number and the subsequent use of the indirect register access. In this example, Instruction 0 176 writes a register number to an indirect register during the standard register write phase 178 of the pipeline. Two intermediate instructions, Instruction 1 180 and Instruction 2 182, that do not access the indirect register are required because the indirect register write occurs after their respective indirect register read phases. Instruction 3 184 is the first instruction after Instruction 0 176 that can access the indirect register data 186 during the indirect register read phase.

In another preferred embodiment, the number of registers which can be used for indirect register access is limited to one or two registers in order to reduce circuit complexity. One register provides minimum functionality but may be all that is needed. Two registers enable the use of a circular buffer with separate read and write location pointers. Limiting the number of indirect registers to one or two registers, means that the processor should always be able to recall the data stored in these one or two registers during the first phase of the d3 stage, then select the operand register number from the one or two indirect sources via a multiplexer and begin recall of the indirectly accessed register operand at the beginning of the second phase of the d3 stage. This may entail the need for another read port, but it would be for only the one or two registers available for indirect register access. Alternatively, the indirect register access instruction could be prohibited from following an instruction accessing the register supporting indirect register access at the cost of introducing another delay slot. Thus another register read port would not be required. This option is feasible if the software reserves these one or two registers for mostly indirect register access.

A variation on the indirect register access limits the instructions supporting indirect register access. Theoretically indirect register access could be made available for any instruction that accesses registers as operands or destination. By analogy some processors support indirect memory access in most or all memory access modes. This support would require more control circuitry than a technique that supports a more limited set of instructions with indirect register access. A good instruction candidate for this limited set of instructions supporting indirect register access is a register to register move instruction permitting indirect register access of a register source operand. This instruction would provide all the flexibility needed for all algorithms with the possible requirement of an additional indirect register move instruction to set up more complex register interaction. In many cases this move may be hidden in the delay slot latency needed between the write to the register holding the indirect register number and its use, so no additional instructions would be needed.

A further variation on the indirect register access instruction, such as the indirect register move instruction, permits specification of less than a whole register data word. Opcode bits within the instruction could enable selection of the high/low 16 bits within the selected 32-bit register or 1st/2nd/3rd/4th byte within the selected 32 bit register. This allows data packing within the 32-bit source register. Another option for transfer of less than all the data within the source register is to right align the data and zero or sign extend into the 32-bit destination register. Limiting the indirect register access to register to register move instructions should make enough opcode space available for these variations because a second source operand is not needed. This variation is useful in cases where less than the whole register width is needed for the look up table entry. Thus more look table entries could be packed into the table registers. This would reduce the number of registers needed to store the table or reduce the memory accesses needed to swap parts of a table too large to retain in the register file. In cases where less than the whole register width may be accessed, the data size, data location and zero/sign extend select could be specified in the instruction or could be included in the register storing the indirect register access number. A 32-bit register includes ample bits to permit designation of the register number accessed (5 bits for 32 registers, 6 bits for 64 registers), as well as the data size to be extracted (2 bits for selecting 32-bit size/16-bit size/8-bit size/4-bit size), the data item (2 bits if minimum data size is a byte, 3 bits if minimum data size is a nibble) and zero/sign extend (1 bit).

Yet another variation on indirect register access provides some register space accessible only via indirect register access. As shown in FIG. 18, within register file 76, the indirectly accessible register space 186 overlaps directly accessible register space 188 to some extent, with registers in overlap area 194 being accessible either indirectly and directly. Two indirect access registers ind0 190 and ind1 192 are used for all indirect accessing of registers in register space 186. Note that if some registers are not directly accessible then they must be indirectly accessible as load or register to register move destinations, otherwise there would be no way to load data into these registers.

Several example systems which can benefit from aspects of the present invention are described in U.S. Pat. No. 5,072,418, in particular with reference to FIGS. 2–18 of U.S. Pat. No. 5,072,418. A microprocessor incorporating an embodiment of the present invention to improve performance or reduce cost may be used to further improve the systems described in U.S. Pat. No. 5,072,418. Such systems include, but are not limited to, video imaging systems, industrial process control, automotive vehicle safety systems, motor controls, robotic control systems, satellite telecommunications systems, echo canceling systems, modems, speech recognition systems, vocoder-modem systems with encryption, and such.

As used herein, the terms "applied," "connected," "connecting," and connection" mean electrically connected, including where additional elements may be in the electrical connection path. As used herein, the term "microprocessor" is intended to encompass "microcomputers," which generally are microprocessors with on-chip Read Only Memory (ROM). As these terms are often used interchangeably in the art, it is understood that the use of one or the other of these terms herein should not be considered as restrictive as to the features of this invention.

Various specific circuit elements well known in the art may be used to implement the detailed circuitry of the preferred embodiments, and all such alternatives are comprehended by the invention. For example, data storage elements such as registers may be implemented using any suitable storage device, such as a latches, flip-flops, FIFOs, memory addresses, or RAM cells. Depending on the particular configuration of a design, a bus may consist of one or more individual lines or buses. Muxes may be implemented using any suitable circuit element, such as logic circuits, tri-state circuits, or transmission gate circuits. Some circuits may be implemented as structurally separate from other circuits, or may be implemented in combination with other circuits.

An alternative embodiment of the novel aspects of the present invention may include other circuitries which are combined with the circuitries disclosed herein in order to reduce the total gate count of the combined functions. Because those skilled in the art are aware of techniques for gate minimization, the details of such an embodiment are not described herein.

Although the invention has been described with reference to a specific processor architecture, it is recognized that one of ordinary skill in the art can readily adapt the described embodiments to operate on other processors. Depending on the specific implementation, positive logic, negative logic, or a combination of both may be used. Also, it should be understood that various embodiments of the invention can alternatively employ hardware, software, microcoded firmware, or combinations of each, yet still fall within the scope of the claims. Process diagrams for hardware are also representative of flow diagrams for microcoded and software-based embodiments. Thus the invention is practical across a spectrum of software, firmware and hardware.

Finally, while this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A data processing apparatus comprising:
    a data register file comprising a plurality of read/write general purpose registers, each of said plurality of registers accessed by a corresponding register access number;
    at least one functional unit connected to said register file;
    at least one indirect register access instruction comprising an operand register number field, and executable by said functional unit; and
    instruction decode circuitry connected to said register file and said functional unit, and responsive to said indirect register access instruction to
        recall data stored in an operand register specified by said operand register number field in said instruction,
        identify said recalled data as a register access number, and
        recall operand data from an indirectly accessed register corresponding to said register access number for use as an operand by said functional unit.

2. The data processing apparatus of claim 1, wherein said instruction further comprises an instruction field for a second operand.

3. The data processing apparatus of claim 1, wherein only a limited set of registers of said data register file can contain indirect register source operands.

4. The data processing apparatus of claim 3, wherein only a single register of said data register file can contain said indirect register source operands.

5. The data processing apparatus of claim 3, wherein only two registers of said data register file can contain said indirect register source operands.

6. The data processing apparatus of claim 1, wherein only a predetermined set of less than all instructions can employ indirect register access.

7. The data processing apparatus of claim 6, wherein said predetermined set of less than all instructions includes a register-to-register move instruction with said indirect register source operand forming a register source for said register-to-register move.

8. The data processing apparatus of claim 1, wherein;
    said indirect register access instruction further includes a destination register number field; and
    said instruction decode circuitry is further responsive to said indirect register access instruction to
        recall data stored in a destination register specified by said destination register number field in said instruction,
        identify said recalled data as a register access number, and
        store output data from said functional unit in an indirectly accessed register corresponding to said register access number.

9. The data processing apparatus of claim 1, wherein operand data stored in at least some registers of said data register file are accessible only via an indirect register access instruction.

10. The data processing apparatus of claim 1, wherein: said data register file includes
    a first set of registers directly accessible via a corresponding register number field in an instruction not an indirect register access instruction and not indirectly accessible via an indirect register access instruction,
    a second set of registers directly accessible via a corresponding register number field in an instruction not an indirect register access instruction and indirectly accessible via an indirect register access instruction, and
    a third set of registers not directly accessible via a corresponding register number field in an instruction not an indirect register access instruction and indirectly accessible via an indirect register access instruction.

11. The data processing apparatus of claim 1, wherein said indirect register access recalls a data item of selected length and selected position from said indirectly accessed register.

12. The data processing apparatus of claim 11, wherein said selected length is a half-word.

13. The data processing apparatus of claim 11, wherein said selected length is a byte.

14. The data processing apparatus of claim 11, wherein said selected length and selected position respectively correspond to a data size value and a data position value stored in a register.

15. The data processing apparatus of claim 14, wherein said data size value and said data position value are stored in a control register.

16. The data processing apparatus of claim 14, wherein said data size value and said data position value are stored in said operand register specified by said operand register number field.

17. The data processing apparatus of claim 14, wherein data size value corresponds to a data size field in said indirect register access instruction and said data position value corresponds to a data position field in said indirect register access instruction.

18. The data processing apparatus of claim 13, wherein said data position value is stored in said operand register specified by said operand register number field.

19. The data processing apparatus of claim 11, wherein said data item is right aligned and zero extended to a length of said indirectly accesses register.

20. The data processing apparatus of claim 11, wherein said data item is right aligned and sign extended to a length of said indirectly accesses register.

21. The data processing apparatus of claim 11, wherein said data item is right aligned and selectively either zero extended or sign extended to a length of said indirectly accesses register dependent upon a zero/sign extend bit of said indirect register access instruction.

22. The data processing apparatus of claim 11, wherein said data item is right aligned and selectively either zero extended or sign extended to a length of said indirectly accesses register dependent upon a zero/sign extend bit of said operand register specified by said operand register number field.

23. A data processing apparatus comprising:
    a data register file comprising a plurality of read/write general purpose registers, each of said plurality of registers accessed by a corresponding register access number;
    at least one functional unit connected to said register file;
    at least one indirect register access instruction comprising a destination register number field, and executable by said functional unit; and instruction decode circuitry connected to said register file and said functional unit, and responsive to said indirect register access instruction to recall data stored in a destination register specified by said destination register number field in said instruction, identify said recalled data as a register access number, and store output data from said functional unit in a register corresponding to said register access number.

24. The data processing apparatus of claim 23, wherein said instruction further comprises an instruction field for at least one operand.

25. The data processing apparatus of claim 23, wherein only a limited set of registers can contain indirect register destinations.

26. The data processing apparatus of claim 25, wherein only a single register can contain said indirect register destinations.

27. The data processing apparatus of claim 25, wherein only two registers can contain said indirect register destinations.

28. The data processing apparatus of claim 23, wherein only a limited set of instructions employ indirect register access.

29. The data processing apparatus of claim 23, wherein at least some registers of said data register file are accessible as destinations only via an indirect register access instruction.

30. The data processing apparatus of claim 23, wherein:

said data register file includes a first set of registers directly accessible via a corresponding register number field in an instruction not an indirect register access instruction and not indirectly accessible via an indirect register access instruction, a second set of registers directly accessible via a corresponding register number field in an instruction not an indirect register access instruction and indirectly accessible via an indirect register access instruction, and a third set of registers not directly accessible via a corresponding register number field in an instruction not an indirect register access instruction and indirectly accessible via an indirect register access instruction.

* * * * *